(12) United States Patent  
Roden et al.

(10) Patent No.: US 6,623,088 B2  
(45) Date of Patent: Sep. 23, 2003

(54) VEHICLE BRAKE BOOST ASSIST CONTROL

(75) Inventors: Mark P Roden, Fenton, MI (US); Bryan Todd Fulmer, Byron, MI (US); Joseph Allen Elliott, Plymouth, MI (US)

(73) Assignee: Delphi Technologies, Inc., Troy, MI (US)

( * ) Notice: Subject to any disclaimer, the term of this patent is extended or adjusted under 35 U.S.C. 154(b) by 59 days.

(21) Appl. No.: 09/804,974

(22) Filed: Mar. 13, 2001

(65) Prior Publication Data

US 2002/0130550 A1 Sep. 19, 2002

(51) Int. Cl.$^7$ .............................. B60T 8/34; B60T 8/42; B60T 13/18
(52) U.S. Cl. ............................... 303/113.1; 303/115.4; 303/DIG. 2; 303/11; 303/177
(58) Field of Search .................... 303/113.1, 113.2, 303/113.3, 113.4, 114.1, 114.3, 115.2, 115.4, 116.1, 116.2, 11, 5, 155, 156, 157, 167, 177, DIG. 1, DIG. 2

(56) References Cited

U.S. PATENT DOCUMENTS

| | | | | |
|---|---|---|---|---|
| 3,829,170 A | * | 8/1974 | Rockwell et al. | ............ 303/186 |
| 4,043,608 A | * | 8/1977 | Bourg et al. | ................. 303/167 |
| 5,091,857 A | * | 2/1992 | Katayama et al. | ........... 701/112 |
| 5,197,787 A | * | 3/1993 | Matsuda et al. | ............... 303/10 |
| 5,445,445 A | * | 8/1995 | Yukio | ....................... 303/113.5 |
| 5,938,297 A | * | 8/1999 | Whaite et al. | ............ 303/114.3 |
| 6,033,038 A | * | 3/2000 | Kulkarni et al. | .......... 303/114.3 |
| 6,033,039 A | * | 3/2000 | Dieringer | ................. 303/114.3 |
| 6,120,112 A | * | 9/2000 | Toda et al. | ............... 303/116.1 |
| 6,196,643 B1 | * | 3/2001 | Yokoyama et al. | ......... 303/166 |
| 6,364,429 B1 | * | 4/2002 | Roden et al. | ............. 303/114.3 |

FOREIGN PATENT DOCUMENTS

JP          5162624 A  *  6/1993

* cited by examiner

Primary Examiner—Jack Lavinder  
Assistant Examiner—Melody M. Burch  
(74) Attorney, Agent, or Firm—Robert M. Sigler

(57) ABSTRACT

A vehicle hydraulic braking system responds to detection of an operator intended high braking intensity event to isolate vehicle brakes from the master cylinder and activate a motor driven pump to generate a maximum predetermined supply pressure, calibrated to provide activation of an anti-lock braking system, to the brake apply valves for an initial predetermined time. Thereafter, the supply pressure is reduced via an electrically controllable pressure relief valve responsive to sensed vehicle deceleration so as to decrease the supply pressure provided to the apply valve to a level just sufficient to provide the sensed vehicle deceleration. The high intensity braking event is detected via a rate of change of master cylinder pressure, pedal force or pedal travel.

6 Claims, 4 Drawing Sheets

VEHICLE BRAKE BOOST ASSIST CONTROL

TECHNICAL FIELD

The technical field of this invention is power assist in vehicle braking systems.

BACKGROUND OF THE INVENTION

Recent attention of brake system designers has been given to the design of brake system controls that will assist a vehicle operator in maximizing the useful application of braking force in an emergency or panic situation to obtain vehicle deceleration to a stop or lower speed in the shortest time and/or distance. In such a situation, wherein it is desired to stop the vehicle in the shortest time and/or distance possible, a high intensity braking effort is required. The phrase "high intensity" is used here to denote a braking force application that is both fast and of great magnitude.

A suggested method of providing such assist is to provide apparatus which, when it detects an operator request for high intensity braking through dynamic movement of the brake pedal, provides an immediate, maximal increase in braking pressure to trigger the vehicle's anti-lock braking control and then to maintain the pressure sufficiently high to allow the antilock braking control to control the deceleration at the highest rate obtainable with the surface coefficient of friction of the road. The increase in braking pressure may be obtained by the control taking over the source of braking assist pressure from control of the vehicle operator, once the desire for such maximal braking is detected, until the vehicle operator signals the end of the situation or the vehicle is stopped. The method overcomes the tendency of many vehicle operators in an emergency to back off somewhat on the brake pedal after an initial hard activation, as illustrated in curve 150 of the graph of FIG. 4, which represents the master cylinder pressure through a braking event that begins with high intensity but undergoes a sag as the driver backs off the braking force somewhat before increasing it again. This tendency results in under-utilization of the maximum braking power obtainable in modern antilock braking systems.

Although some brake system designers have suggested controls working through vacuum assist units such as are commonly used in power braking systems, it is also possible to provide brake assist with a hydraulic assist system incorporated in the anti-lock brake modulator. Such a system provides an isolation valve between the master cylinder and the brake apply mechanism and a hydraulic pump for brake fluid which is activated by the control to quickly provide a hydraulic supply pressure much higher than master cylinder pressure to the anti-lock apply valves controlling the braking pressure at the individual wheel brake apply units. The pressure generated by the pump is typically limited by a pressure relief valve, which is provided a predetermined blow-off value equal to the highest hydraulic pressure contemplated or allowed. When this system is adapted for emergency braking control, this may result in supply pressures when the pump is in use that are significantly higher than required for most functions involving the anti-lock module, so that the difference between the supply pressure and the pressure provided to the wheel brake units is very large. The result of this is excess noise, from the pump and from hydraulic hammering as valves open and close, and also excess energy use and wear as the pump provides pressures significantly higher than those required for most braking operations using the modulator.

SUMMARY OF THE INVENTION

The control of this invention controls a vehicle hydraulic braking supply pressure in a vehicle braking system having a wheel brake, an apply valve for applying the supply pressure to the wheel brake when opened and isolating the wheel brake from the supply pressure when closed, a brake pedal, a master cylinder responsive to the brake pedal to generate a master cylinder pressure and a motor driven hydraulic pump having an outlet to the apply valve. Hydraulic valve apparatus connected between the master cylinder and the apply valve has a first condition providing open hydraulic pressure communication from the master cylinder to the apply valve and a second condition preventing hydraulic pressure communication from the master cylinder to the apply valve. The hydraulic valve apparatus is provided with an electrically controllable pressure release valve permitting controlled pressure relief from the pump to the master cylinder. A sensor indicating operator requested braking intensity is monitored to detect an operator intended high braking intensity event.

Upon detection of the operator intended high braking intensity event, the control places the hydraulic valve means in its second condition, operates the pump and controls the electrically controllable pressure relief valve to generate a maximum predetermined supply pressure to the apply valve for an initial predetermined time. The control senses vehicle deceleration and, after the initial predetermined time, controls the electrically controllable pressure relief valve responsive to the sensed vehicle deceleration so as to decrease the supply pressure provided to the apply valve to a level just sufficient to provide the sensed vehicle deceleration.

In a preferred embodiment of this invention, the vehicle braking system has an anti-lock brake control responsive to wheel spin to control the apply valve to modulate the supply pressure so as to reduce wheel brake pressure and minimize the wheel spin and the maximum predetermined supply pressure is calibrated to produce wheel spin and thus activate the anti-lock brake control.

A preferred embodiment of this invention periodically derives a desired target wheel pressure varying with the magnitude of the sensed vehicle deceleration, derives a target wheel pressure error between a present target wheel pressure and the desired target wheel pressure, slew rate limits the target wheel pressure error, decreases the target wheel pressure by the slew rate limited target wheel pressure error controls the electrically controllable pressure relief valve to reduce the supply pressure toward the decreased target wheel pressure.

In a preferred embodiment of this invention, after the initial predetermined time the motor speed of the pump is controlled in response to the target wheel pressure error so as to maintain pump output pressure just higher than the supply pressure maintained by the electrically controllable pressure relief valve.

DESCRIPTION OF THE PREFERRED EMBODIMENT

Figure 1:
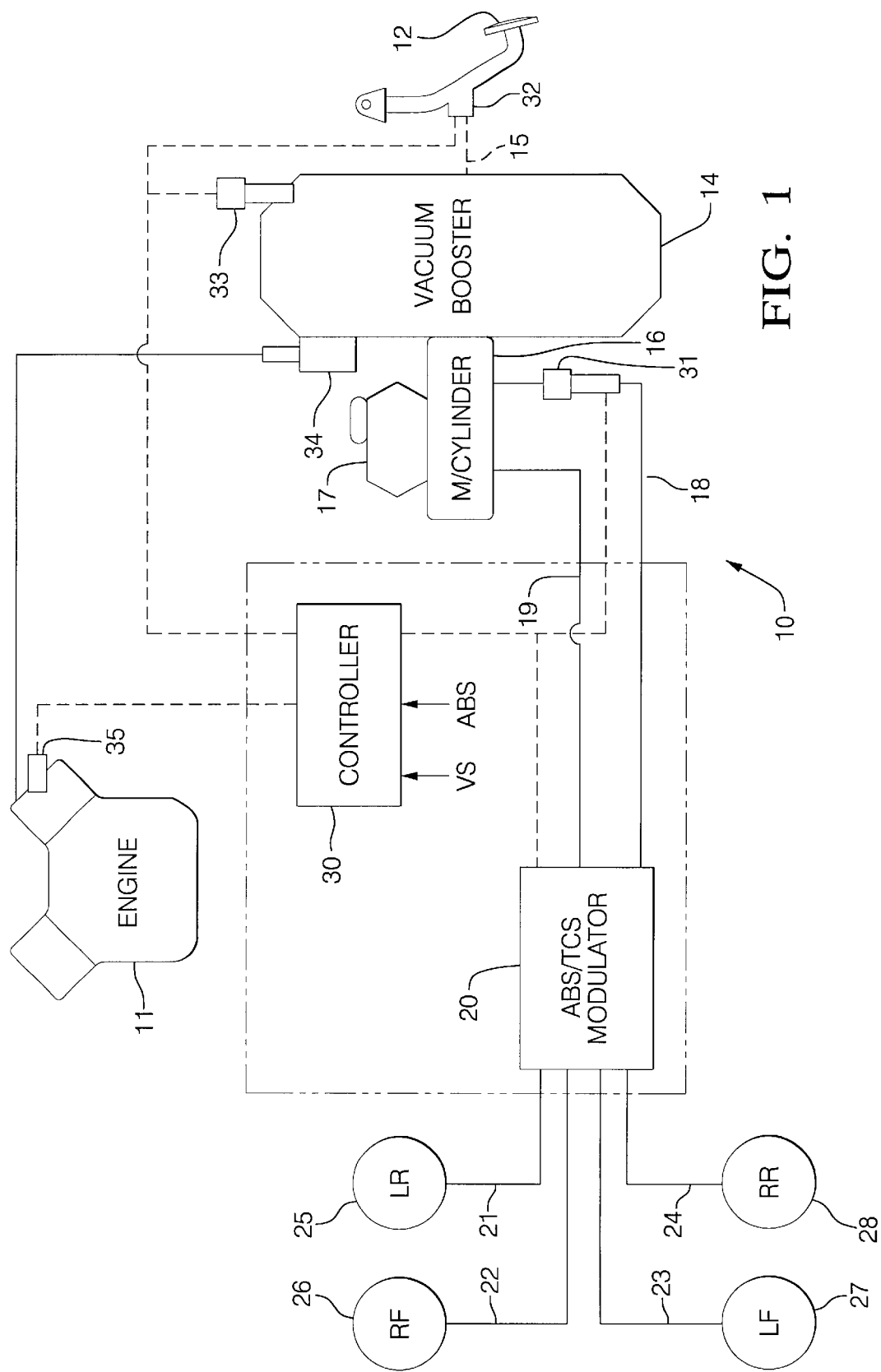
FIG. 1 is a schematic illustration of a brake system provided with a control according to the apparatus and method of this invention.

FIG. 1 illustrates a brake system 10 in combination with an engine 11. Brake system 10 includes a brake pedal 12 that provides input to a power booster 14 through a push-rod 15. The force applied to the push-rod by the operator is increased by booster and is communicated to a master cylinder 16. Master cylinder 16 includes a fluid reservoir 17 for supplying the brake fluid needs of brake system 10. Master cylinder 16 is of the conventional dual piston type wherein movement of master cylinder pistons in response to force exerted by booster 14 develops hydraulic pressure that is transmitted to a split brake system through brake lines 18 and 19. Brake lines 18 and 19 extend through an ABS/TCS modulator 20 and branch into brake lines 21–24 that connect with four wheel brakes in wheel brake assemblies 25–28.

An electronic controller 30 is provided for managing operation of brake system 10. Controller 30 communicates with modulator 20 and also with an engine sensor 35 and braking parameter sensors 31–33. Sensor 31 is a pressure sensor for monitoring the fluid pressure in brake line 18 as generated by master cylinder 16. Sensor 32 is a brake pedal travel (or force) sensor for monitoring manually applied operator braking intent. In the system of this invention, it has been found preferable to use either both the master cylinder pressure sensor 31 and the travel sensor 32 or two master cylinder pressure sensors for redundancy. Sensor 33 is a vacuum sensor for monitoring the working vacuum/pressure level in the working chamber of booster 14. Sensor 35 is a manifold air pressure sensor for monitoring engine vacuum. A vacuum check valve 34 prevents loss of vacuum from booster 14 to engine 11 and may optionally include a vacuum sensor for a direct reading of the vacuum supplied to booster 14. Controller 30 is also provided with wheel speed signals VS from standard wheel speed sensors at wheel brake assemblies 25–28 for determining vehicle speed and acceleration through conventional means. By monitoring and processing signals from the sensors, controller 30 is capable of detecting a vehicle operator intended panic or emergency stop and assisting the operator in obtaining a stop at the maximum rate consistent with vehicle equipment and traction between the vehicle tires and road surface.

Figure 2:
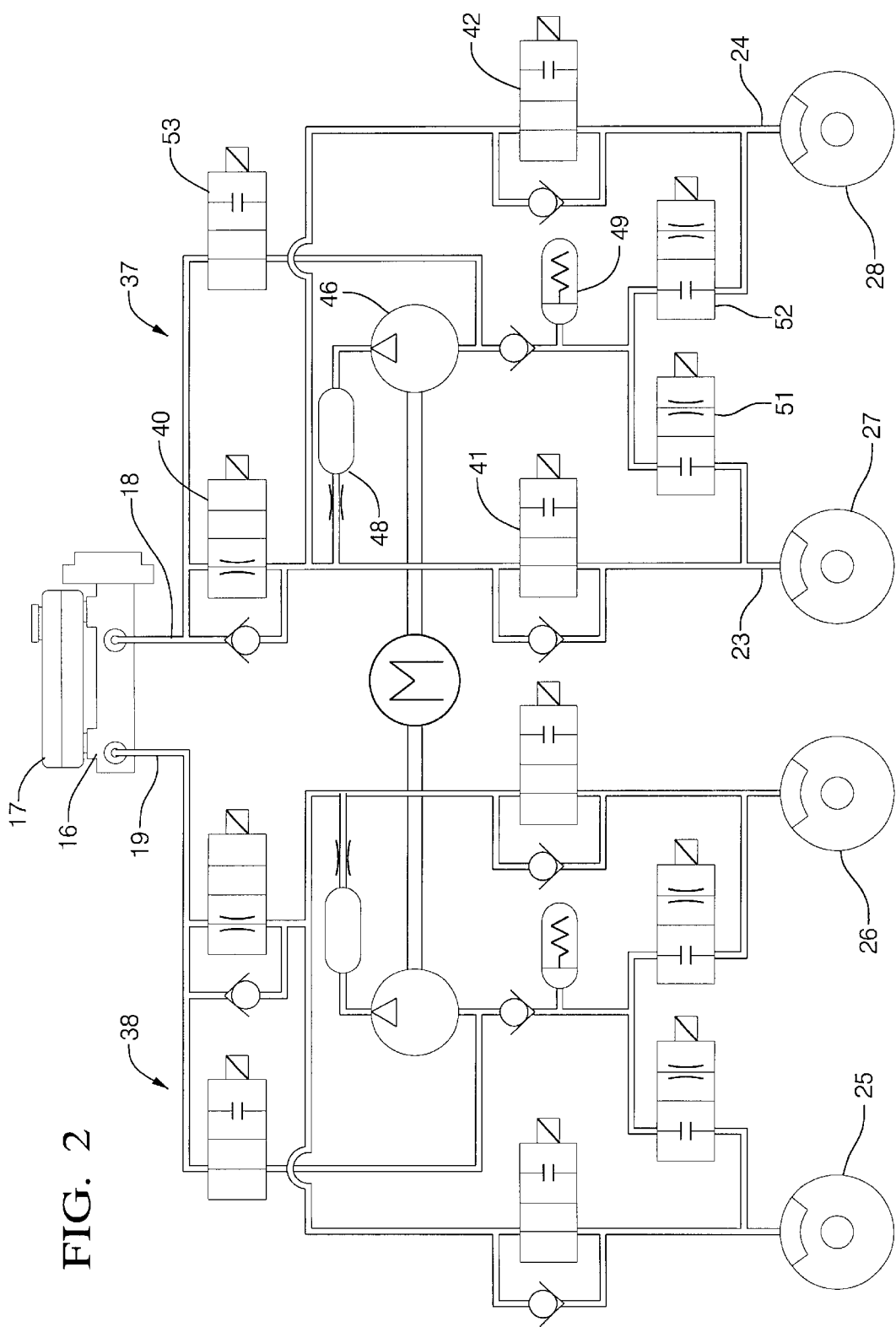
FIG. 2 is a schematic illustration showing details of the ABS/TCS modulator of FIG. 1.

FIG. 2 illustrates details of modulator 20. Brake lines 18 and 19 each extend into modulator 20 to provide a split braking system arrangement. In the present embodiment a diagonally split system is provided wherein brake line 18 supplies left front wheel brake 27 and right rear wheel brake 28 through channel 37, and brake line 19 supplies right front brake 26 and left rear brake 25 through channel 38. For simplicity of description, the details of channel 37 will be discussed with the understanding that the details of channel 38 are substantively the same and operate in the same manner.

Channel 37 supplies two wheel brakes through brake lines 23 and 24 with a direct connection normally being provided between master cylinder 16 and wheel brakes 27 and 28 through channel 37 when isolation valves 40 and apply valves 41 and 42 are in their open positions and release valves 51 and 52 and prime valve 53 are in their closed positions. In this normal condition, the manual application of force to brake pedal 12, shown in FIG. 1, actuates master cylinder 16 through push-rod 15 with power assist from booster 14 such that a braking pressure is generated in braking lines 18 and 19. This manually induced braking pressure is transmitted through channel 37, including isolation valve 40, apply valve 41 and apply valve 42, to wheel brakes 27 and 28. Brake line 24 may include an optional proportioner, not shown, for use in supplying braking pressure to rear wheel brake 28 in proportion to the pressure supplied to front wheel brake 27, when preferred. Through this normal base brake mode of operation, channel 37 enables the actuation of wheel brakes 27 and 28 directly in response to the manually actuated, power boosted master cylinder 16. Channel 38 operates similarly for base brake modes. Channel 37 also includes a pump 46, driven by motor M, and a damper assembly 48 provided on the outlet side of pump 46 to reduce the affects and noise pulsations created by pump 46. Release valves 51 and 52 are used in coordination with apply valves 41 and 42 for ABS and TCS operations, along with prime valve 53 and isolation valve 40, in the normal manner. Operation of the system during ABS and TCS events, as well as the well known structure and operation of booster 14, are described in U.S. Pat. No. 5,938,297 to Whaite et al, Method and Device for Brake Application, issued Aug. 17, 1999, describes the use of ABS/TCS brake fluid pump and modulators included in many vehicles for providing anti-lock braking and brake-based traction control (TCS) to provide supplementary braking pressure at the wheels during booster runout conditions. Any relevant portions of this patent are incorporated by reference.

In this application, isolation valve 40 is provided with electrically controlled blow-off capability. A PWM signal controls a variable orifice so that the valve may be full open or fully closed; but the fully closed position is achieved at less than 100% PWM so that the valve will be opened by fluid at a pressure controlled by the PWM signal, as shown in a U.S. patent application Ser. No. 09/304,877, filed May 4, 1997 by Subramanian et al and assigned to the assignee of this application. Any relevant portion of this latter patent application is incorporated by reference. The direction of the blowoff, regardless of whether it is obtained in the aforementioned isolation valve with electrically controlled blow-off capability or in a separate pressure relief valve in parallel with an isolation valve as shown in the aforementioned U.S. Pat. No. 5,938,297, is backward from the outlet of pump 46 to lines from master cylinder 18, which also communicates with prime valve 53.

When an emergency braking condition is signaled by the vehicle operator, the operation of pump 46 is initiated or increased as required, and the prime valve 53 is opened to supply brake fluid under pressure from master cylinder 16 to the inlet of pump 46 for channel 37. Additionally, isolation valve 40 is closed so that the fluid supplied through apply valve 41 and 42 is now derived from the outlet of pump 46 at a pressure increased from that of master cylinder 16 by an amount added by pump 46. Isolation valve 40 limits and therefore controls the pump outlet pressure through its controlled blow-off capability, with the blown-off fluid recirculating through the prime valve or returning to the master cylinder. The motor driving pump 46 and variable blowoff of isolation valve 40 are controlled by controller 30 to provide a braking pressure required to push the vehicle wheels to the point of wheel slip and thus initiate anti-lock braking action; and this condition is maintained, under system control, until a release signal is received from the vehicle operator or the vehicle achieves a stopped condition or some other predetermined low velocity considered to show the end of the emergency stop.

For ease of communication and efficiency, controller 30 preferably provides all centralized braking and traction controls, including the control of this invention, in a common package including a microcomputer. But for ease and simplicity of explanation, controller 30 will be described as if it were dedicated to the control method of this invention, with reference to the flow chart of FIG. 3.

Figure 3:
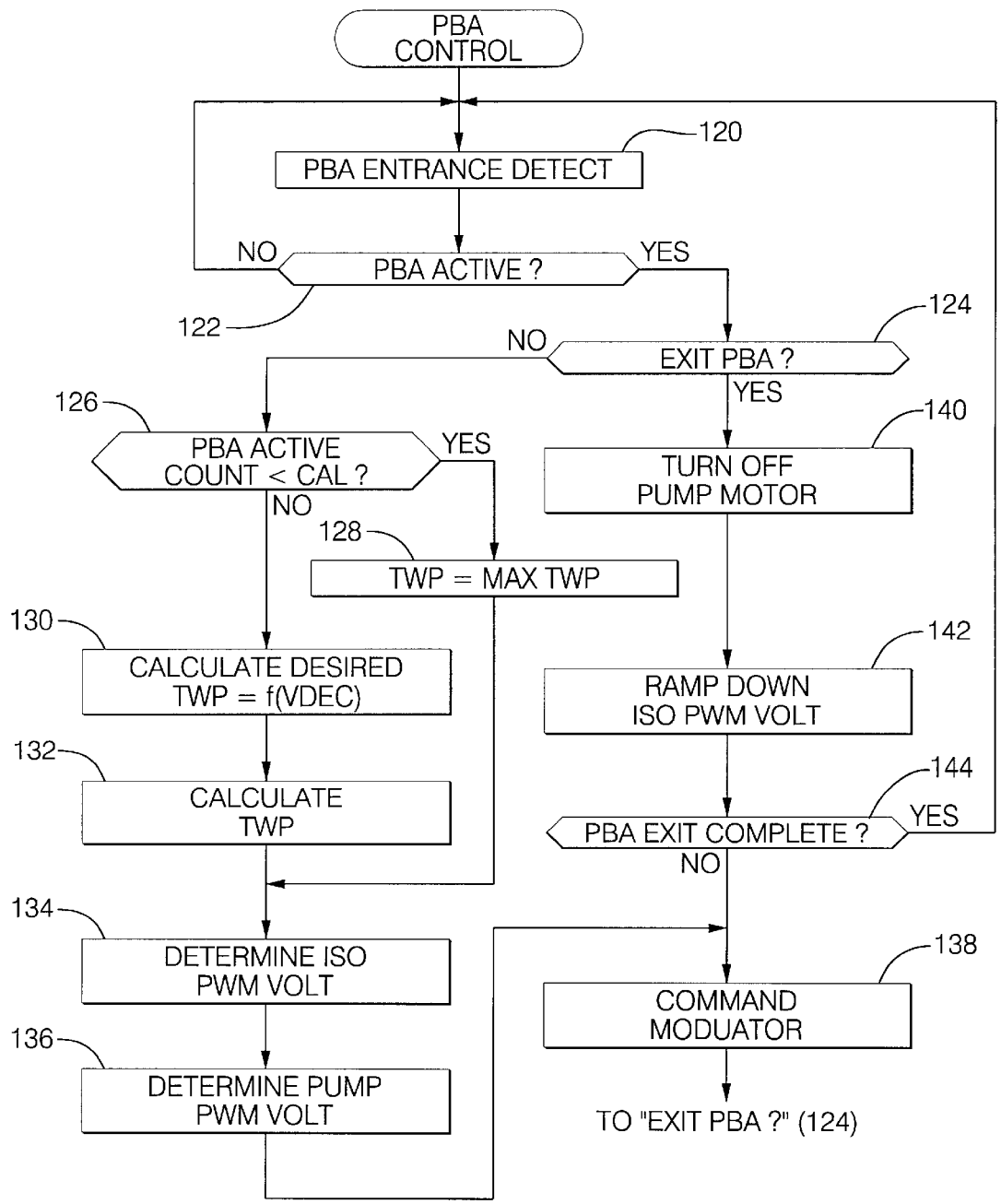
FIG. 3 is a flow chart illustrating the method of this invention using the ABS/TCS modulator of FIG. 2 in the brake system of FIG. 1.

Referring to FIG. 3, program PBA CONTROL is illustrated as a stand-alone program to be stored in and run by controller 30. But with slight structural changes, it could be equivalently called by an overall brake control program or in response to a repeated timed interrupt. The program begins by determining the existence of PBA entry conditions in step 120, which may be accomplished in a separate, called subroutine. The PBA entrance conditions depend somewhat on the sensor(s) available, but the main goal is to detect, by means of a measurable physical quantity, a driver intent to exert the brakes hard and fast.

Figure 4:
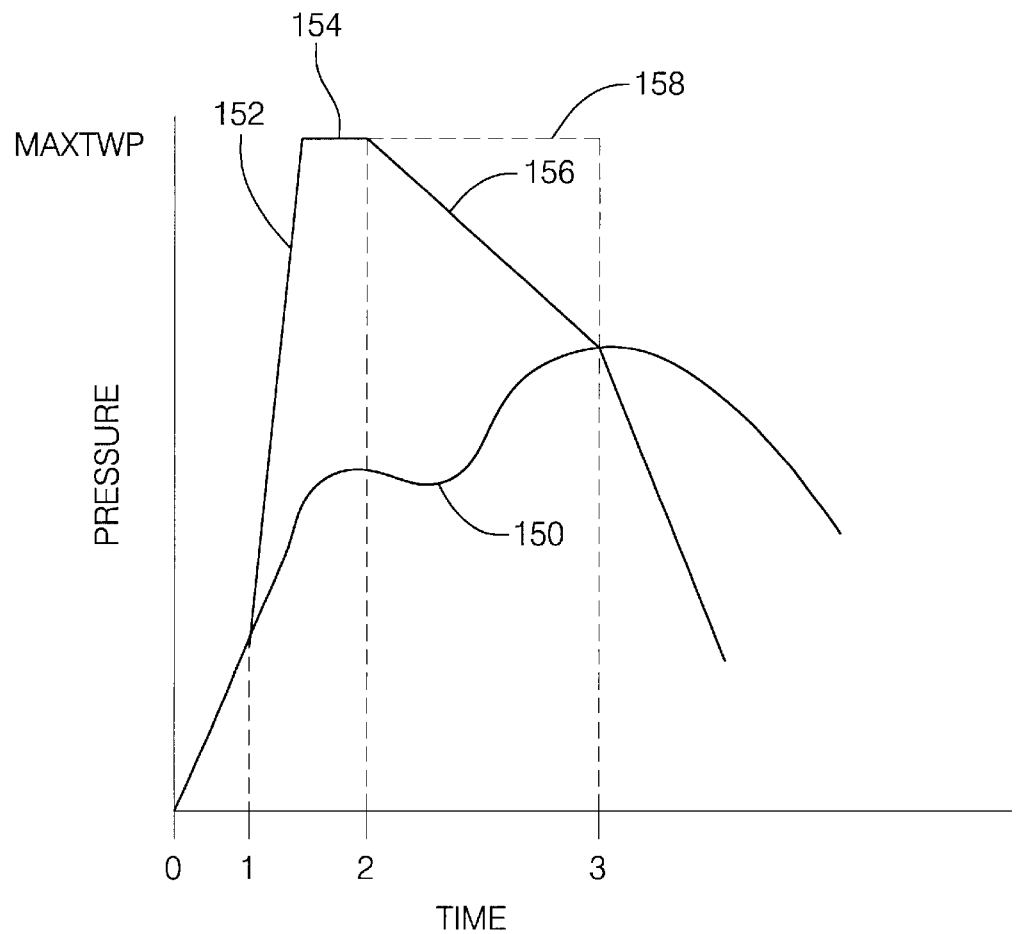
FIG. 4 is a plot of braking force as a function of time in an emergency situation in the system of FIGS. 1–3 and in a prior art system.

For example, for a master cylinder pressure sensor, the slope (time rate of change) of Master Cylinder Pressure (as indicated, for example by sensor 31) is compared with an Entrance Slope value, which may preferably be calculated as a decreasing linear function of Master Cylinder Pressure, since the difficulty of achieving a given Master Cylinder Pressure Slope increases with Master Cylinder Pressure. If the Entrance Slope value is exceeded, a counter is incremented; and if it is not, the counter is decremented toward zero. When the counter reaches a calibrated value and the Master Cylinder Pressure exceeds a calibrated value and ABS (anti-lock brake system) is not activated, the entry conditions are satisfied. The initial period of detection of a PBA event is shown on the time (horizontal) axis of the graph of FIG. 4 between 0 and 1, in which the master cylinder pressure curve 150 is rising with a sufficient slope for a sufficient time to satisfy the entry conditions. One could substitute Brake Pedal Travel Slope for Master Pressure Cylinder Pressure Slope in the comparison above and achieve much the same result; or use both simultaneously, if desired. If the entry conditions are satisfied, a PBA ACTIVE flag is set and a PBA counter is incremented.

Next, the PBA ACTIVE flag is checked at step 122. If PBA is not active, the program returns to step 120 to check the entry conditions again. But if PBA is active, the program increments a PBA ACTIVE count and proceeds to check PBA exit conditions at step 124, which may also be accomplished in a subroutine. These conditions will be discussed in detail at a later point in this description. If any of the exit conditions is true, the PBA ACTIVE flag and count are reset; and the program goes into its exit routine, also to be described at a later point.

If no exit condition is determined at step 124, the program proceeds to step 126, where the PBA ACTIVE count is checked. If it is less than a calibrated value CAL, a target wheel pressure value TWP is set equal to a high value MAXTWP for chosen wheels. This value is set high enough for maximum stopping power. Referring again to FIG. 4, the almost vertical line segment 152 represents the fast rise of supply pressure to the maximum value MAXTWP; and the short horizontal solid line segment 154 represents the supply pressure, supplied by the pump, remaining at the maximum value MAXTWP while the counter is timing to the calibrated value CAL, which is reached at the time indicated as 2 on the horizontal axis. The timer period from 1 to 2 on the horizontal axis may be termed the first time period of PBA control, in which the objective is merely to raise the supply pressure, and therefore the wheel pressure, to a high level as fast as possible. Although not absolutely necessary for the operation of the invention, in most cases the pressure will be sufficient to make the wheel slip and thus trigger anti-lock brake control.

Figure 5:
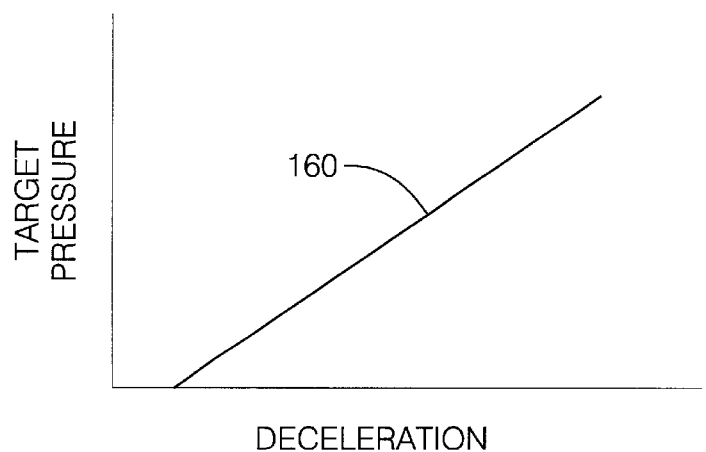
FIG. 5 is a plot of target wheel pressure as a function of vehicle deceleration illustrating one aspect of the operation of the control of FIGS. 1–3.

On the other hand, when the calibration value CAL is reached, the program proceeds from step 126 to step 130, where a desired value of TWP is derived as a function of vehicle deceleration VDEC, e.g. a direct linear variation as shown in line 160 of the graph of FIG. 5, and then to step 132 where a value of TWP itself is calculated. This calculation involves first deriving the required decrease in target wheel pressure to achieve the desired target wheel pressure, $$TWP\ Decrease = TWP - Desired\ TWP,$$

next slew rate limiting this difference, and finally decreasing TWP by the slew limited value, $$TWP = TWP - Slew\ Limited\ TWP\ Decrease.$$

With a value of TWP determined, either TWPMAX from step 128 or the value calculated in steps 130 and 132, the program proceeds to step 134 and calculates a PWM control value for isolation valve 40 or the equivalent controllable pressure relief valve to control the hydraulic supply pressure applied to the apply valves. This first requires determination of the Target Wheel Pressure Error, which is obtained by subtracting the Master Cylinder Pressure, which represents the portion of the total Target Wheel Pressure provided by the vehicle operator and booster, from the Target Wheel Pressure:

$$Target\ Wheel\ Pressure\ Error = Target\ Wheel\ Pressure - Master\ Cylinder\ Pressure$$

A voltage ISO PWM VOLT corresponding to this Target Wheel Pressure Error is then derived, e.g. by the following equation:

$$ISO\ PWM\ VOLT = (Target\ Wheel\ Pressure\ Error * GAIN3) + OFFSET3,$$

Where GAIN3 and OFFSET3 are stored calibration constants predetermined for the specific apparatus. Alternatively, the value could be determined in a table lookup.

Referring again to FIG. 4, the decrease in target wheel pressure, and thus in supply pressure to the apply valve, as described above with reference to steps 130 and 132, is achieved in the second time period of the PBA event, which is bounded by numbers 2 and 3 on the horizontal axis. During this time period, the supply pressure is decreasing along line segment 156, as compared with the prior art supply pressure maintained at the maximum level along dashed line 158 due to the fixed pressure relief. It is in this time period that the advantages of the control of this invention over those of the prior art become apparent, as the electrically controllable pressure relief valve is controlled as a function of sensed vehicle deceleration to minimize the excess supply pressure while the maximum intensity braking is achieved.

Next, a pump motor voltage PUMP PWM VOLT is derived in step 136. Although the isolation valve 40 or equivalent controllable pressure relief valve provides the actual pressure control, the pump itself must generate a pressure larger than the required pressure so that pressure control may be obtained by the blow-off action of isolation valve 40 or pressure relief valve. PUMP PWM VOLT is based on Target Wheel Pressure Error with a goal of achieving a constant slow motor speed which will reduce pump noise, e.g. according to the following equation:

$$\text{PUMP } PWM \text{ VOLT}=\text{Minimum Pump Voltage}+(\text{Target Wheel Pressure Error}/\text{GAIN4}),$$

where Minimum Pump Voltage and GAIN4 are calibrated constants.

In order to provide enough pump flow to the wheels during all PBA events it may be necessary to increase the pump motor voltage. When Master Cylinder Pressure is increasing, PUMP PWM VOLT is increased by the following amount:

$$\text{GAIN5}*(\Delta\text{Target Wheel Pressure Error})^2$$

wherein GAIN5 is a calibrated constant. ISO PWM VOLT and the PUMP PWM VOLT are provided as commands to isolation valve 40 (or controllable pressure release valve) and motor M, respectively, at COMMAND MODULATOR step 138 before the program returns to step 124. The efficient control of the pump motor speed to provide just enough pump output pressure for the electrically controlled pressure relief valve to control to the lowest appropriate value, is another advantage of the system.

The exit conditions determined at step 124 will now be described. Essentially, they are signals of either a system error or a sign that PBA is not required, either because it will produce no faster stop than the normal brake operating mode or because the vehicle operator appears to be no longer requesting it. Any of the following conditions will cause an exit, regardless of specific sensors used:

1. A sensed failure of the PBA hardware or software; or
2. A signal that the brake is not applied, such as is obtainable from pedal travel sensor 32 or its equivalent; or
3. Vehicle speed below a calibrated value (e.g. 5 kph) lower than the entry requirement for hysteresis; or
4. Master cylinder pressure below a calibrated value lower than the entry requirement for hysteresis; or
5. Target Wheel Pressure (TWP) below Master Cylinder Pressure in Region 2 (while TWP is supposed to equal TWPMAX per step 128).

Other exit conditions depend on the sensor set. If Master Cylinder Pressure alone is sensed (preferably with two sensors for redundancy):

1. Master Cylinder Pressure falls below the Master Cylinder Pressure measured when PBA went active; or
2. Master Cylinder Pressure falls some pressure differential below the Maximum Master Cylinder Pressure logged during the PBA event.

If Master Cylinder Pressure and Brake Pedal Travel are used, then an exit condition is the following: Either one of the conditions for Master Cylinder Pressure only, described in the preceding paragraph ((1)Master Cylinder Pressure falls below the Master Cylinder Pressure measured when PBA went active or (2) Master Cylinder Pressure falls by a calibrated pressure differential below the Maximum Master Cylinder Pressure logged during the PBA event), together with (AND) Pedal Travel falls by a calibrated travel differential below the maximum Pedal Travel logged during the PBA event).

If step 124 provided a decision to exit PBA, motor M is turned off at step 140 to reduce noise, since further brake fluid flow is not required. This also prevents a vacuum from being formed between prime valve 53 and pump 46. Also, exiting a PBA exit, the isolation valve voltage is ramped down to zero. The rate of the voltage decrement is based upon driver intent. The routine looks at Master Cylinder Pressure to accomplish this. This allows the driver to exit as fast as he would like without forcing him out and causing objectionable pedal feel. A new ISO PWM VOLT is calculated at step 142 according to the following equation:

$$ISO \ PWM \ \text{VOLT}=\text{Previous } ISO \ PWM \ \text{VOLT}-\text{GAIN5}*\Delta\text{Master Cylinder Pressure}$$

The program next determines at step 144 if the PBA event is complete. This will not be true until the loop after the ISO PWM VOLT is reduced to zero. When it is, true, the program returns from step 138 to step 120. Until then, the program provides the new, lower value of ISO PWM VOLT to the modulator in step 138 before returning to step 120.

What is claimed is:

1. Method of controlling a vehicle hydraulic braking supply pressure in a vehicle braking system having a wheel brake, an apply valve for applying the supply pressure to the wheel brake when opened and isolating the wheel brake from the supply pressure when closed, a brake pedal, a master cylinder responsive to the brake pedal to generate a master cylinder pressure, a motor driven hydraulic pump having an outlet to the apply valve and hydraulic valve means connected between the master cylinder and the apply valve and having a first condition providing open hydraulic pressure communication from the master cylinder to the apply valve and a second condition preventing hydraulic pressure communication from the master cylinder to the apply valve, the method comprising the steps:

providing the hydraulic valve means with an electrically controllable pressure release valve permitting controlled pressure relief from the pump to the master cylinder;

providing a sensor indicative of operator requested braking intensity and monitoring the sensor to detect an operator intended high braking intensity event;

upon detection of the operator intended high braking intensity event, performing the following additional steps:

(1) placing the hydraulic valve means in its second condition;

(2) operating the pump and controlling the electrically controllable pressure release valve to generate a maximum predetermined supply pressure to the apply valve for an initial predetermined time;

(3) sensing vehicle deceleration;

(4) after the initial predetermined time, controlling the electrically controllable pressure release valve responsive to the sensed vehicle deceleration so as to decrease the supply pressure provided to the apply valve to a level just sufficient to provide the sensed vehicle deceleration, wherein the vehicle braking system has an anti-lock brake control responsive to wheel spin to control the apply valve to modulate the supply pressure so as to reduce wheel brake pressure and minimize the wheel spin and wherein the maximum predetermined supply pressure is calibrated to produce the wheel spin and thus activate the anti-lock brake control.

2. Method of controlling a vehicle hydraulic braking supply pressure in a vehicle braking system having a wheel brake, an apply valve for applying the supply pressure to the wheel brake when opened and isolating the wheel brake from the supply pressure when closed, a brake pedal, a master cylinder responsive to the brake pedal to generate a master cylinder pressure, a motor driven hydraulic pump having an outlet to the apply valve and hydraulic valve means connected between the master cylinder and the apply valve and having a first condition providing open hydraulic pressure communication from the master cylinder to the apply valve and a second condition preventing hydraulic pressure communication from the master cylinder to the apply valve, the method comprising the steps:

providing the hydraulic valve means with an electrically controllable pressure release valve permitting controlled pressure relief from the pump to the master cylinder;

providing a sensor indicative of operator requested braking intensity and monitoring the sensor to detect an operator intended high braking intensity event;

upon detection of the operator intended high braking intensity event, performing the following additional steps:

(1) placing the hydraulic valve means in its second condition;

(2) operating the pump and controlling the electrically controllable pressure release valve to generate a maximum predetermined supply pressure to the apply valve for an initial predetermined time;

(3) sensing vehicle deceleration;

(4) after the initial predetermined time, controlling the electrically controllable pressure release valve responsive to the sensed vehicle deceleration so as to decrease the supply pressure provided to the apply valve to a level just sufficient to provide the sensed vehicle deceleration, wherein the step of controlling the electrically controllable pressure release valve after the initial predetermined time further comprises the steps of:

periodically deriving a desired target wheel pressure varying with the magnitude of the sensed vehicle deceleration;

deriving a target wheel pressure error between a present target wheel pressure and the desired target wheel pressure;

slew rate limiting the target wheel pressure error;

decreasing the target wheel pressure by the slew rate limited target wheel pressure error; and controlling the electrically controllable pressure release valve to reduce the supply pressure toward the decreased target wheel pressure.

3. Method of controlling a vehicle hydraulic braking supply pressure in a vehicle braking system having a wheel brake, an apply valve for applying the supply pressure to the wheel brake when opened and isolating the wheel brake from the supply pressure when closed, a brake pedal, a master cylinder responsive to the brake pedal to generate a master cylinder pressure, a motor driven hydraulic pump having an outlet to the apply valve and hydraulic valve means connected between the master cylinder and the apply valve and having a first condition providing open hydraulic pressure communication from the master cylinder to the apply valve and a second condition preventing hydraulic pressure communication from the master cylinder to the apply valve, the method comprising the steps:

providing the hydraulic valve means with an electrically controllable pressure release valve permitting controlled pressure relief from the pump to the master cylinder;

providing a sensor indicative of operator requested braking intensity and monitoring the sensor to detect an operator intended high braking intensity event;

upon detection of the operator intended high braking intensity event, performing the following additional steps:

(1) placing the hydraulic valve means in its second condition;

(2) operating the pump and controlling the electrically controllable pressure release valve to generate a maximum predetermined supply pressure to the apply valve for an initial predetermined time;

(3) sensing vehicle deceleration;

(4) after the initial predetermined time, controlling the electrically controllable pressure release valve responsive to the sensed vehicle deceleration so as to decrease the supply pressure provided to the apply valve to a level just sufficient to provide the sensed vehicle deceleration, wherein the step of controlling the electrically controllable pressure release valve after the initial predetermined time further comprises the step of controlling a motor speed of the pump so as to maintain pump output pressure just higher than the supply pressure maintained by the electrically controllable pressure relief valve.

4. The method of claim 3 wherein the step of controlling the electrically controllable pressure release valve after the initial predetermined time further comprises the steps of periodically deriving a desired target wheel pressure varying with the magnitude of the sensed vehicle deceleration and deriving a target wheel pressure error between a present target wheel pressure and the desired target wheel pressure, and wherein the motor speed of the pump is controlled in response to the target wheel pressure error.

5. The method of claim 1 wherein the sensor indicative of operator requested braking intensity comprises a master cylinder pressure sensor and the detection of the operator intended high braking intensity event comprises determining the time rate of change of sensed master cylinder pressure.

6. The method of claim 1 wherein the sensor indicative of operator requested braking intensity comprises a brake pedal travel sensor and the detection of the operator intended high braking intensity event comprises determining the time rate of change of sensed brake pedal travel.

* * * * *